United States Patent [19]  [11] 3,895,705
Bockau et al.  [45] July 22, 1975

[54] SCRAPER CHAIN CONVEYOR
[75] Inventors: Gustav Bockau, Bochum; Willi Gormann, Wanne-Eickel; Werner Fernholz; Pal Frenyo, both of Bochum, all of Germany
[73] Assignee: Gebr. Eickhoff, Maschinenfabrik und Eisengiesserei m.b.H., Bochum, Germany
[22] Filed: Jan. 23, 1974
[21] Appl. No.: 435,882

[30] Foreign Application Priority Data
Jan. 31, 1973 Germany............................ 2304560

[52] U.S. Cl.................................. 198/109; 198/137
[51] Int. Cl............................................. B65g 41/00
[58] Field of Search ............. 198/137, 109, 229, 99, 198/100, 168, 204

[56] References Cited
UNITED STATES PATENTS
| 2,512,610 | 6/1950 | Cartlidge | 198/109 |
| 2,715,527 | 8/1955 | Cartlidge et al. | 198/109 X |
| 2,744,614 | 5/1956 | Sibley | 198/109 |

Primary Examiner—Evon C. Blunk
Assistant Examiner—James M. Slattery
Attorney, Agent, or Firm—Brown, Murray, Flick & Peckham

[57] ABSTRACT

A scraper chain conveyor includes a driven chain having links constructed from material that is round in cross section. Flight attachments are pulled by the chain along a conveyor channel that includes at least two channel sections that are pivotally connected together in an end-to-end relation for angular positioning of one of the sections with respect to the other. The channel section, extending downstream of the pivotal connection with respect to the conveying direction, has a downwardly sloping portion commencing from a transverse plane immediately adjacent the pivotal interconnection. The other conveyor section has top guides extending over it along its opposite sides. Each of these guides has one of their terminal ends lying in a transverse plane adjacent to and upstream of the pivotal interconnection between the conveyor sections. The chain intersects the two transverse planes at points and passes between them along an arcuate path, the maximum height of which from a subtending cord through the points of intersection is smaller than one-half the length of a given one of the flight attachments.

5 Claims, 5 Drawing Figures

SCRAPER CHAIN CONVEYOR

BACKGROUND OF THE INVENTION

Propulsion and loading equipment are used in conjunction with conveyors that incorporate scrapers for transporting materials away from such equipment. The discharge end of the conveyor is adjustable in horizontal and vertical planes. The channel of the conveyor may consist of two sections that are pivotally interconnected in adjustable manner so that they can swivel at the level at which the material is to be conveyed. For this purpose, means are employed in the bottom of the channel to form the pivotal interconnection. At both ends of the conveyor, a sprocket wheel is installed for rotation about a horizontal axis. The sprocket wheels engage an endless chain that is centrally located in the channel and carry along with it scrapers at spaced intervals along the length of the chain. One of the sprocket wheels is driven for propelling the chain and scrapers along the channel. The chain is actually constructed to form a sprocket chain made up of individual units which are connected together, in a flexible manner, by horizontal pins. In front of and behind each of the scrapers there is an additional joint formed by a vertical pin which provides the sprocket chain with sufficient flexibility in the horizontal plane for accommodating an angular relation between the conveyor sections.

The two pivotally interconnected sections are equipped with overhead guides that overlap the scraper ends in these sections so that the scrapers will at all times rest upon the floor surface and slide along the sections. The overhead guides are omitted from the adjoining area at the pivotal interconnection because at these locations depending upon the adjusted position of the channel sections, the overhead guides at each side would be pulled apart or pushed together. If the bend formed by the two conveyor channel sections is rather tight, then the pull on the chain pushes the scrapers against the interior side wall at the curved area between channel section with a considerable force. In view of this, a relatively stiff sprocket chain, one which cannot be twisted about its own longitudinal axis, is required to prevent the scraper ends located at the outer perimeter of the curved area from being raised from the floor surface as the scrapers pass through the area of the pivotal interconnection. What is important here, of course, is the assurance that the ends of the scrapers will not be lifted out of the conveyor channels as they pass from one section to the other. Thus, in addition to transmitting the propelling force to the individual scrapers, the sprocket chain also fulfills the task of guiding the scrapers in the curved area between the conveyor channels and retaining the scrapers at the floor of the conveyor channels. This required capability of providing guidance along a relatively short portion of the conveyor route, for the scrapers by way of the pulling chain has, up until now, always been achieved by providing the specially designed sprocket chain. This chain design is costly to produce due to the additional vertical joint pins located before and behind each scraper.

SUMMARY OF THE INVENTION

It is an object of the present invention to provide a less costly form of apparatus to transmit a propelling force to scrapers and at the same time to provide guidance for scrapers at locations of a pivotal interconnection between channel sections of a conveyor.

It is a further object of the present invention to provide a scraper chain conveyor with pivotally interconnected channel sections along which a driven chain, having links constructed from material that is round in cross section, carries and maintains scraper attachments along the floor of the conveyor channel particularly at the pivotal interconnection by reason of an arrangement and construction of parts.

More specifically, the present invention provides a scraper chain conveyor comprising, a driven chain having links constructed from material that is round in cross section, a plurality of flight attachments, each having a length extending transverse to the chain, the flight attachments are connected centrally between their opposite ends to the chain at spacedapart locations, a conveyor channel including at least first and second channel sections connected together in an end-to-end relation by a pivotal interconnection for angularly positioning one of the sections with respect to the other section about an axis extending in a direction normal to the conveying direction, the first channel section extending downstream from the pivotal interconnection with respect to the conveying direction, the first channel section having a chain support floor that slopes downwardly commencing from a transverse plane immediately adjacent the pivotal interconnection and sloping downwardly in the downstream direction, and top guides extending along opposite sides above the chain support floor of the second channel section for the flight attachments, the top guides each having one of their terminal ends lying in a transverse plane adjacent to and upstream of the pivotal interconnection, the forces acting on the chain passing from the second channel section cause it to travel along an arcuate path through points of intersection with the transverse planes, the maximum height of the arcuate path from a subtended cord through the points of intersection is smaller than one-half the length of a flight attachment.

The scrape chain conveyor of the present invention, when constructed and dimensioned according to the teachings thereof, makes possible the utilization of commercial round link chain that is capable of swiveling in all directions and capable of rotating around its longitudinal axis to transfer the propelling force for the conveyor and to provide the function of guiding the scrapers in the curved area between pivotally interconnected conveyor sections where overhead guides cannot be provided. The unique movement of the round link chain as it passes from one channel section to the next is made possible because the flight attachments are subjected to downward forces as the chain is drawn downwardly along the downwardly sloping chain support floor of the downstream channel. This causes the round link chain to be pressed against the floor of the channel section. Actual demonstrations of apparatus embodying the features of the present invention have demonstrated that over-head guides at the curved area between angularly disposed channel sections are not needed to maintain the proper disposition of the flight attachments. These tests have also demonstrated that the scrapers are pressed against the floor of the channel sections with sufficient force such that the outstretched ends of the flight attachments always remain in contact with the floor, thus retaining an effective conveying position even in instances of maximum pull on the chain.

Significantly, the channel section located downstream of the pivotal interconnection has the aforesaid sloping floor portion inclined at an angle of about 8°–10° in relation to the conveying plane. When such an inclined floor is provided at the bottom of the first channel section, then sufficient torque is produced such that the downward vertical force component on the flight attachments assumes a sufficient value to retain the attachments at the floor of the conveyor channel without causing an increase in frictional forces between the floor and the flight attachments while at the same time without noticeably increasing wear and tear on the moving parts with respect to the stationary parts.

These features and advantages of the present invention as well as others will be more fully understood when the following description is read in light of the accompanying drawings, in which.

Figure 1:
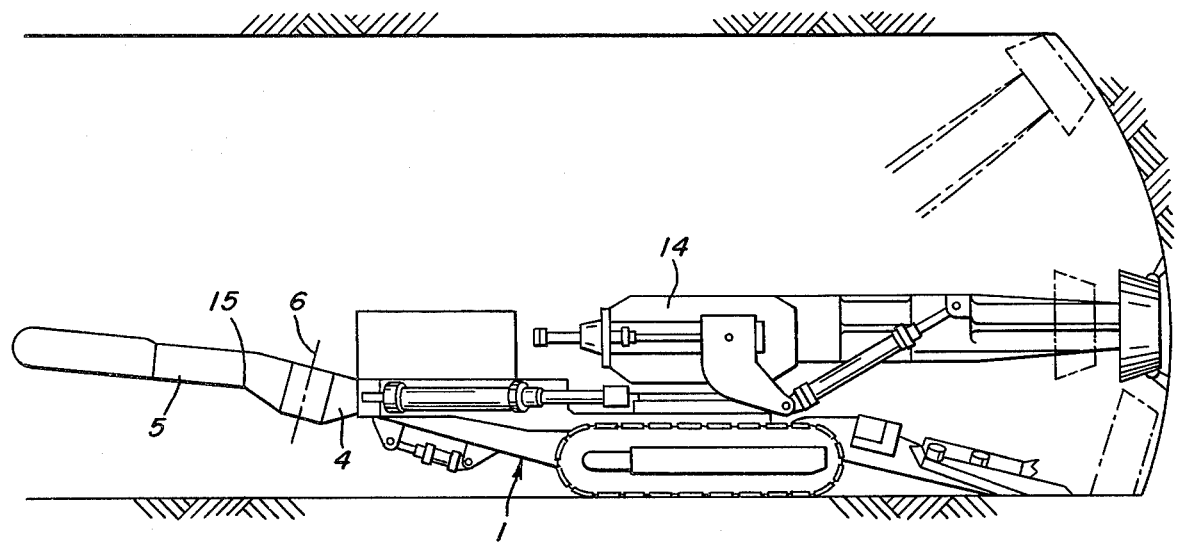
FIG. 1 illustrates an elevational view of a drive unit along with the scraper chain conveyor embodying the features of the present invention.
Figure 2:
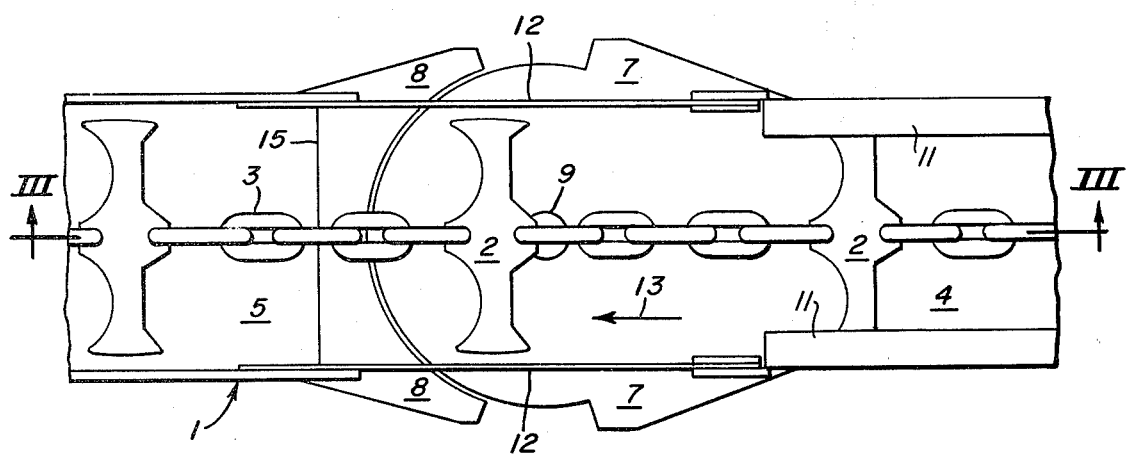
FIG. 2 is a partial plan view of a scraper chain conveyor illustrating the pivotal interconnection between two conveyor channel sections thereof.
Figure 5:
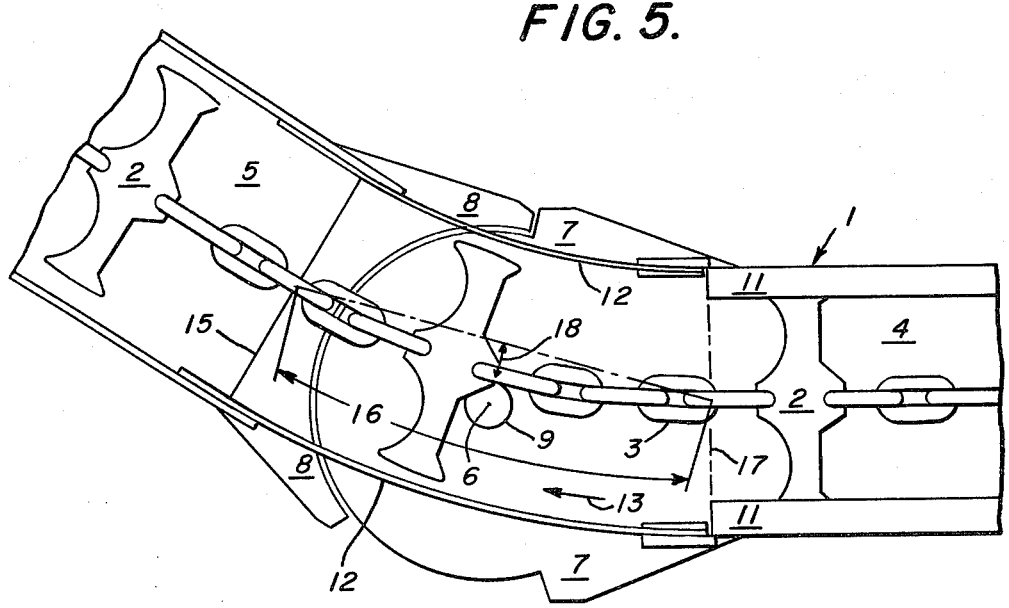
FIG. 5 is a view similar to FIG. 2 but illustrating end-to-end conveyor channel sections pivotally interconnected and angularly disposed one with respect to the other.

In FIG. 1, there is illustrated a scraper chain conveyor 1 for a drive unit 14. This drive unit may include a coal mining machine as schematically illustrated by FIG. 1. FIGS. 2–5 illustrate, in greater detail, the scraper chain conveyor 1 which includes a plurality of flight attachments 2 each having a length substantially spanning the width of the conveyor channel. The flight attachments are connected centrally between their opposite ends to a driven chain 3 having links constructed from material that is round in cross section. Such a round link chain can rotate with the flight attachments 2 in a vertical plane and it is adjustable in all directions whereby the chain can be rotated about its longitudinal axis. In this manner, the chain can always follow the course of the conveyor channel which, for the purpose of disclosing the present invention, consists of two channel sections 4 and 5. These sections may be made up of two or more conveyor channel subsections between which the features of the present invention may be employed. The conveyor sections 4 and 5 are connected together in an end-to-end relation by a pivotal interconnection for angularly positioning one of the sections with respect to the other about an axis 6 extending in a direction normal to the conveying direction. The end-to-end flexible connection is clearly illustrated in the drawings whereby the conveyor channel sections can rotate about the axis 6. Lugs 7 on conveyor section 4 and lugs 8 on the conveyor section 5 form engagable stops as illustrated in FIG. 5 to limit the extent of pivotal movement between the conveyor sections. Connecting the sections together and lying along the pivotal axis 6 are two flanged studs 9 and 10 that face each other and are held together by bolts or the like, not shown.

Figure 3:
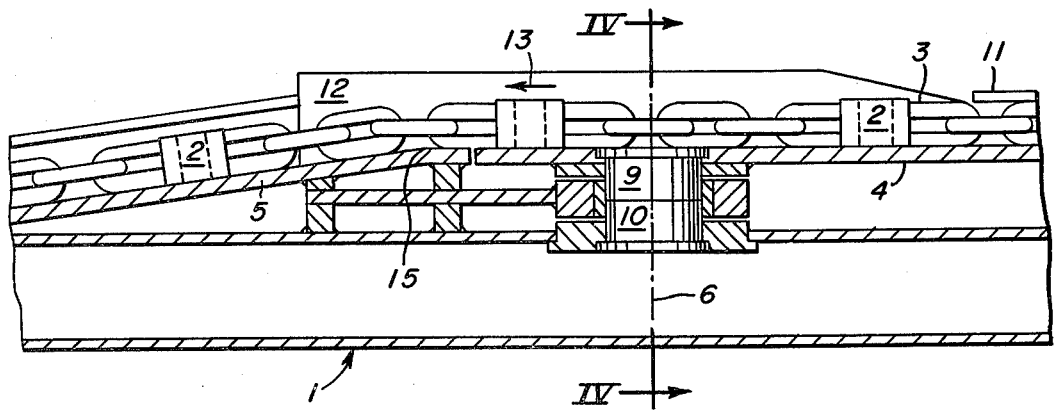
FIG. 3 is a sectional view taken along line III—III of FIG. 2.
Figure 4:
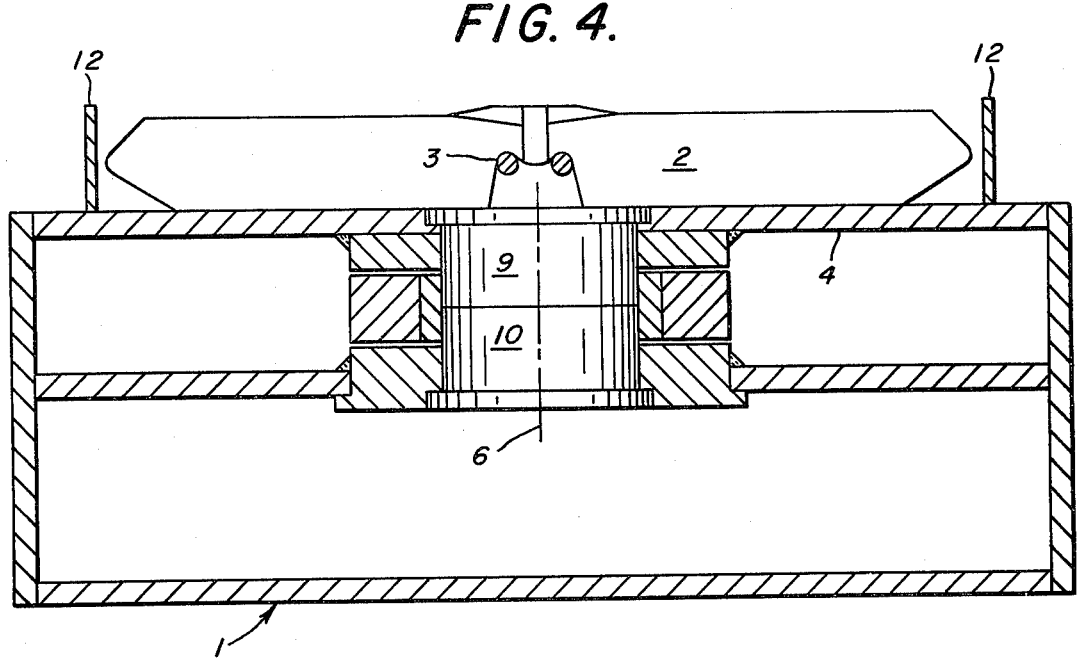
FIG. 4 is a sectional view taken along line IV—IV of FIG. 3.

At the adjoining areas between the conveyor sections 4 and 5 surrounding the axis 6, there is an absence of overhead guides which usually projected from the sides of the conveyor at a spaced distance above the floor. As shown in FIGS. 3 and 5, guides 11, form right angles with the side walls of the conveyor section 4 and overlap the ends of the flight attachments as they pass along the floor of this conveyor section toward the pivotal interconnection. In other words, the guides 11 extend from the conveyor section which is upstream of the pivotal interconnection. The guides 11 retain the flight attachments and thus the round link chain 3 at the floor along the straight length of conveyor section 4. The guides prevent the flight attachments from sliding over the material being transported by the conveyor.

Elastic plates 12 form opposed side walls between the channel sections 4 and 5. At the location of these side walls, the round link chain must take over the function of the missing overhead guides and must retain the flight attachments at the floor of the conveyor sections. For this purpose, the floor of the conveyor section 5 located downstream of the flanged studs 9 and 10, is bent downwardly starting at a transverse plane 15 which is immediately adjacent the pivotal interconnection. From the plane 15, the floor slops downwardly in the downstream direction. The conveying direction is indicated by arrow 13. The slope of the floor, which commences at plane 15, is approximately 8°–10° relative to the conveyor plane and results in the creation with the aid of the chain's propelling force, a torque component in the round link chain 3 that has a downward direction causing the round link chain and the flight attachments 2 to be pressed against the floor of the conveyor channel. Thus, even if the conveyor sections 4 and 5 are angularly displaced one with respect to the other at a substantial non-alignment (FIG. 5), the segment of the round link chain traversing the swivel axis and the flight attachments 2 located there, are prevented from leaving or moving away from the floor of the conveyor. This is significantly true in regard to the ends of the flight attachments that are situated at the exterior of the bend. This position control of the flight attachments operates in a trouble-free manner only if the arcuate path 16 traveled by the round link chain 3 (FIG. 5) is curved. The arcuate path 16 intersects a transverse plane 17 where the terminal ends of the overhead guides 11 are located. The path 16 also intersects the transverse plane 15 at which the downwardly sloping floor commences. The maximum height 18 of this arcuate path from a subtending cord that passes through the points of intersection in planes 15 and 17 is smaller than one-half the length of a flight attachment. So long as the height 18 always remains smaller than one-half the length of a flight attachment, successful troublefree operation will follow even at the maximum permissible misalignment between the conveyor sections 4 and 5. Within the arcuate path 16 traveled by the chain, each of the flight attachments 2 is subjected to the effect of a portion of the torque component directed toward the floor of the conveyor section. The torque component is created by the bending edge at the transverse plane 15. In addition, within each one of the flight attachments 2, there is a radial force component due to the pulling force of the chain which is effective and directed toward the center of the arcuate path 16. When the distance 18 is limited as indicated above, then the lifting moment at the exterior ends of the flight attachments from the conveyor section always remains smaller than the moment of force pressing the exterior end of the flight attachments against the floor of the conveyor sections. The flight attachments are, therefore, retained as they pass in succession along the arcuate path 16 in their operating position at the floor of the conveyor sections 4 and 5 without the aid or use of overhead guides.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. A scraper chain conveyor comprising:
a driven chain having links constructed from material that is round in cross section;
a plurality of flight attachments each having a length extending transverse to said chain, said flight attachments being connected centrally between their opposite ends to said chain at spaced-apart locations for receiving a pulling force transmitted by said driven chain;
a conveyor channel including at least first and second channel sections connected together in an end-to-end relation by a pivotal interconnection for angularly positioning one section with respect to the other about an axis extending in a direction normal to the conveyor direction;
said first channel section extending downstream from said pivotal interconnection with respect to the conveying direction, said first channel section having a downwardly sloping chain support floor commencing from a transverse plane immediately adjacent said pivotal interconnection and sloping downwardly in the downstream direction; and
top guides extending along opposite sides of said second channel section for said flight attachments, said top guides each having one of their terminal ends lying in a transverse plane adjacent to and upstream of said pivotal interconnection, the forces acting on said chain and said flight attachments due to the pull on the driven chain and said downwardly sloping chain support floor being such that as said chain passes along an arcuate path at the pivotal interconnection, the chain intersects points in said transverse planes, the maximum height of said arcuate path from a subtending cord through said points of intersection is smaller than one-half the length of a flight attachment.

2. The scraper chain conveyor according to claim 1 wherein a slope of 8°–10° defines the downward slope of said first channel section.

3. The scraper chain conveyor according to claim 1 further comprising a flexible side wall extending between said transverse planes along opposite sides of said first and second channel sections.

4. The scraper chain conveyor according to claim 1 wherein said pivotal interconnection is further defined to include pivot pin means for pivotally interconnecting the floor surfaces of said first and second channel sections.

5. The scraper chain conveyor according to claim 4 further comprising stop means for limiting relative pivotal movement of said first and second channel sections to such an extent that the maximum height of said subtending cord to said arcuate path is less than one-half the length of a flight attachment.

* * * * *